United States Patent
Nishikawa (10) Patent No.: US 9,052,189 B2
(45) Date of Patent: Jun. 9, 2015

(54) MEASUREMENT APPARATUS FOR MEASURING SHAPE OF TEST OBJECT AND MEASUREMENT METHOD

(71) Applicant: CANON KABUSHIKI KAISHA, Tokyo (JP)

(72) Inventor: Yuya Nishikawa, Utsunomiya (JP)

(73) Assignee: CANON KABUSHIKI KAISHA (JP)

( * ) Notice: Subject to any disclaimer, the term of this patent is extended or adjusted under 35 U.S.C. 154(b) by 185 days.

(21) Appl. No.: 13/761,349

(22) Filed: Feb. 7, 2013

(65) Prior Publication Data

US 2013/0229664 A1 Sep. 5, 2013

(30) Foreign Application Priority Data

Mar. 1, 2012 (JP) ................................. 2012-045786

(51) Int. Cl.
*G01B 11/30* (2006.01)
*G01B 11/24* (2006.01)
*G01B 9/02* (2006.01)

(52) U.S. Cl.
CPC ........ *G01B 11/2441* (2013.01); *G01B 9/02076* (2013.01); *G01B 9/02032* (2013.01); *G01B 2290/60* (2013.01)

(58) Field of Classification Search
CPC .. G01B 11/2441; G01B 11/24; G01B 11/306; G01B 9/02057; G01B 9/02027; G01B 9/02039; G01B 9/0209; G01B 11/02; G01B 2290/70; G01B 9/02; G01B 9/02003; G01B 9/02021; G01B 9/0207; G01B 9/02085
See application file for complete search history.

(56) References Cited

U.S. PATENT DOCUMENTS 6,344,898 B1 * 2/2002 Gemma et al. ................ 356/513
6,495,819 B1 * 12/2002 Cerwin et al. ........... 250/227.19

FOREIGN PATENT DOCUMENTS

JP 08-219738 A 8/1996
JP 2000-275021 A 10/2000

OTHER PUBLICATIONS

Takeda M et al, "Fourier-Transform Method of Fringe-Pattern Analysis for Computer-Based Topography and Interferometry", Journal of the Optical Society of America, American Institute of Physics, NY; US, vol. 72, No. 1 Jan. 1, 1982, pp. 156-160, XP000570893. Cited in European Search Report in counterpart application EP13000561.4 dated May 27, 2013.

(Continued)

*Primary Examiner* — Michael P Stafira
(74) *Attorney, Agent, or Firm* — Rossi, Kimms & McDowell LLP (57) ABSTRACT

A measurement apparatus includes: a vibration detection surface which has a set relative position with respect to a test surface, and is irradiated with a part of the measurement light; an image sensor configured to sense, together with a first interference fringe generated by interference between reference light from a reference surface and measurement light from the test surface, a second interference fringe generated by interference between light from the vibration detection surface and the reference light; and a processor configured to obtain a relative vibration between the reference surface and the test surface by using data of the sensed second interference fringe, and obtain the shape of the test surface by using the obtained relative vibration and data of the sensed first interference fringe.

9 Claims, 4 Drawing Sheets

(56) References Cited

OTHER PUBLICATIONS

Melozzi M et al, "Vibration-Insensitive Interferometer for On-Line Measurements", Applied Optics, Optical Society of America, Washington, DC; US, vol. 34, No. 25, Sep. 1, 1995, pp. 5595-5601, XP000522985. Cited in European Search Report in counterpart application EP13000561.4 dated May 27, 2013.

European Search Report issued in counterpart application No. EP13000561.4 dated May 27, 2013.

* cited by examiner

MEASUREMENT APPARATUS FOR MEASURING SHAPE OF TEST OBJECT AND MEASUREMENT METHOD

BACKGROUND OF THE INVENTION

1. Field of the Invention

The present invention relates to a measurement apparatus for measuring the shape of a test object and a measurement method.

2. Description of the Related Art

A light wave interferometer using the interference of light generally has a high measurement accuracy, so even a weak vibration occurring during measurement has large influence on the measurement result. Therefore, demands have arisen for reducing measurement errors caused in the light wave interferometer by vibrations. Japanese Patent Laid-Open No. 8-219738 has disclosed a method of detecting a relative vibration between a reference surface and test surface by using an acceleration sensor, and moving at least one of the reference surface and test surface so as to cancel the fluctuation in the relative position, thereby reducing measurement errors caused during measurement by vibrations.

In Japanese Patent Laid-Open No. 2000-275021, a measurement error caused on the shape of a test surface by a disturbance vibration is corrected by using the property that when a phase error caused by a disturbance vibration is much smaller than a phase shift amount, a phase $\phi'$ calculated by the phase shift method is approximately represented by:

$$\phi'=\phi+a\cdot\cos(2\phi)+b \qquad (1)$$

where $\phi$ is the true value of a phase. Also, each of an amplitude a and constant term b changes in accordance with the vibration state during measurement, and has a different value whenever measurement is performed.

In Japanese Patent Laid-Open No. 2000-275021, an interference signal generated by a reflected light beam from an error detection surface positioned around a test surface and a reflected light beam from a part of a reference surface is measured simultaneously with an interference signal generated by the test surface and reference surface, and the phase distribution on the error detection surface is measured by the phase shift method. Then, the coefficients $\underline{a}$ and b in equation (1) are calculated from the measured phase distribution on the error detection surface, and a measurement error generated on the shape of the test surface by a disturbance vibration is corrected by using the coefficients $\underline{a}$ and b.

In Japanese Patent Laid-Open No. 8-219738, however, a plurality of acceleration sensors are necessary to directly detect the relative vibration between the reference surface and test surface. This increases the apparatus cost compared to ordinary interferometers. In Japanese Patent Laid-Open No. 2000-275021, the apparatus cost does not largely increase because a measurement error caused by a vibration can be measured by adding only the error detection surface. In Japanese Patent Laid-Open No. 2000-275021, however, correction is performed using an approximate expression represented by equation (1), so it is impossible to accurately correct a measurement error caused by a disturbance vibration if the vibration amount is large.

SUMMARY OF THE INVENTION

The present invention provides a measurement apparatus capable of inexpensively and accurately correcting a measurement error caused by a disturbance vibration.

The present invention in its first aspect provides a measurement apparatus for measuring a shape of a test surface by detecting a first interference fringe generated by interference between reference light from a reference surface and measurement light from the test surface, the apparatus comprising: a vibration detection surface which has a set relative position with respect to the test surface, and is irradiated with a part of the measurement light; an image sensor configured to sense, together with the first interference fringe, a second interference fringe generated by interference between light from the vibration detection surface and the reference light; and a processor configured to obtain a relative vibration between the reference surface and the test surface by using data of the sensed second interference fringe, and obtain the shape of the test surface by using the obtained relative vibration and data of the sensed first interference fringe.

The present invention in its second aspect provides a measurement method for measuring a shape of a test surface by detecting a first interference fringe generated by interference between reference light from a reference surface and measurement light from the test surface, the method comprising steps of: sensing, together with the first interference fringe, a second interference fringe generated by interference between the reference light and light from a vibration detection surface which has a set relative position with respect to the test surface and is irradiated with a part of the measurement light; and obtaining a relative vibration between the reference surface and the test surface by using data of the sensed second interference fringe, and obtaining the shape of the test surface by using the obtained relative vibration and data of the sensed first interference fringe.

Further features of the present invention will become apparent from the following description of exemplary embodiments with reference to the attached drawings.

DESCRIPTION OF THE EMBODIMENTS

First Embodiment

Figure 1:
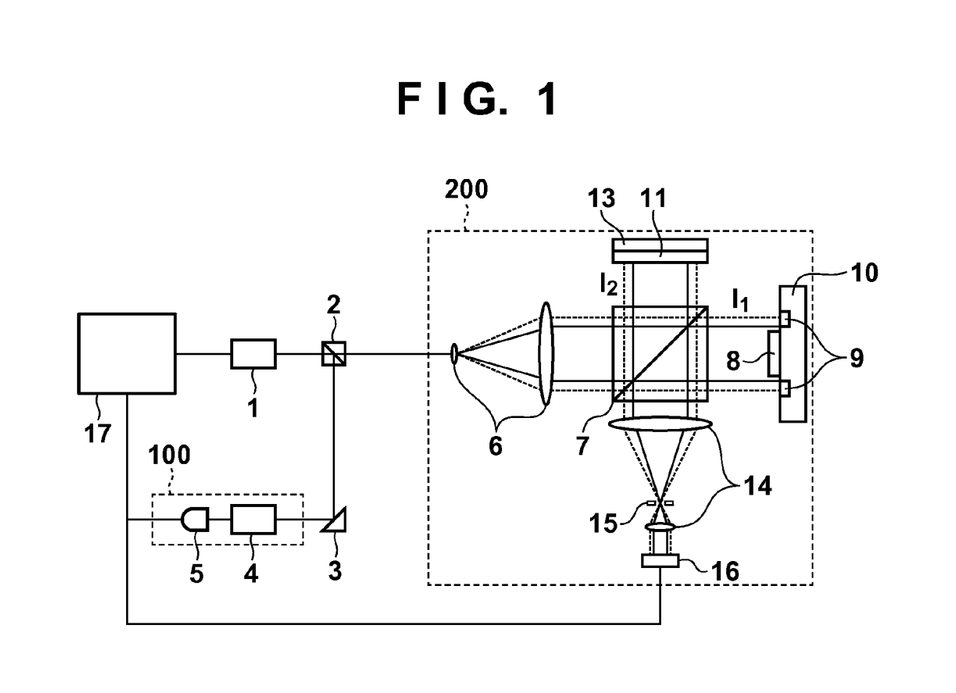
FIG. 1 is a view showing a measurement apparatus according to the first embodiment.

FIG. 1 is an exemplary view showing an example of a measurement apparatus for measuring the shape of a test surface by detecting interference fringes (first interference fringes) generated by interference between reference light irradiating a reference surface and measurement light irradiating the test surface according to the first embodiment. In the first embodiment, the most basic arrangement using one light source will be explained. However, the number of light sources is not limited to one, and the measurement apparatus may also use a synthetic wavelength having a measurement range enlarged by using a plurality of light sources having different wavelengths.

A non-polarizing beam splitter 2 divides a light beam emitted from a light source 1. One divided light beam is guided to a wavelength measurement unit 100, and the other divided light beam is guided to an interferometer unit 200. The light beam guided to the wavelength measurement unit 100 is reflected by a mirror 3, transmitted through a gas cell 4, and incident on a detector 5. Based on the light intensity detected by the detector 5, a control unit 17 performs control such that the wavelength of the light beam emitted from the light source 1 is stabilized to a wavelength reference as the absorption line of the gas cell 4. On the other hand, the light beam guided to the interferometer unit 200 is expanded to a desired beam diameter by a beam expander 6.

A non-polarizing beam splitter 7 divides the expanded light beam into a light beam (measurement light) $I_1$ and a light beam (reference light) $I_2$. A part of the light beam (measurement light) $I_1$ is incident on a test surface 8, and the other part is incident on a vibration detection surface 9. The light beam (reference light) $I_2$ is incident on a reference surface 11. The reference surface 11 is positioned on a piezoelectric element 13 as an element for shifting the phase of the light beam $I_2$, and changing the difference between the optical path lengths of the light beams $I_1$ and $I_2$. When measuring an image of an interference fringe, the control unit (processor) 17 applies a voltage to the piezoelectric element 13. This enables fringe scan synchronized with the sensing timing of a image sensor 16 (ex. CCD sensor, CMOS sensor). The image sensor 16 senses an image of two dimensions. The image sensor 16 may comprise plural sensors.

Figure 2:
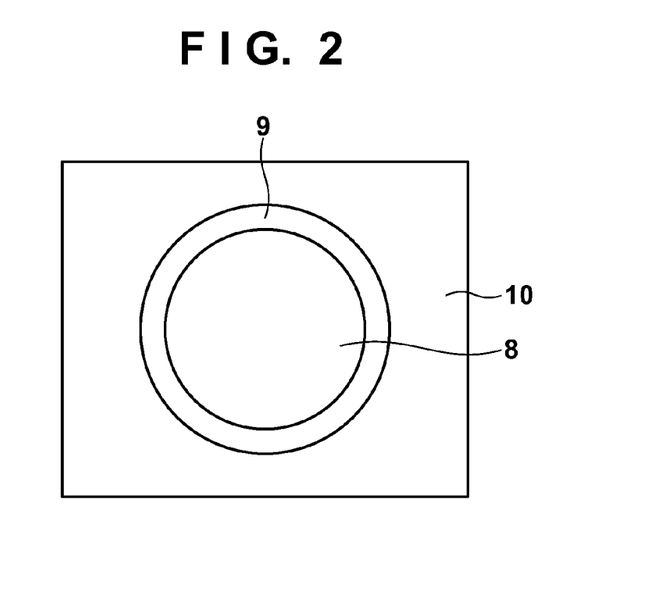
FIG. 2 is a view showing the positional relationship between a test surface and vibration detection surface.

As shown in FIG. 2, the vibration detection surface 9 is positioned outside the test surface 8, and fixed to a mounting base 10 on which a test object is mounted, such that a relative position with respect to the test surface 8 is constant. The vibration detection surface 9 is a plane mirror and inclined to a plane perpendicular to the optical axis of the light beam (measurement light) $I_1$. Consequently, the vibration detection surface 9 is inclined relative to the reference surface 11. Although the first embodiment uses the inclined vibration detection surface 9, it is also possible to use a vibration detection surface 9 having stair-casing steps. The light beam $I_1$ is reflected by the test surface 8 and vibration detection surface 9, and returns to the non-polarizing beam splitter 7. The light beam $I_2$ is reflected by the reference surface 11, and returns to the non-polarizing beam splitter 7. Referring to FIG. 1, the solid lines of the light beams $I_1$ and $I_2$ indicate light beams corresponding to the test surface 8, and the dotted lines indicate light beams corresponding to the vibration detection surface 9.

The light beams $I_1$ and $I_2$ are combined by the non-polarizing beam splitter 7, and incident on the image sensor 16 via an image formation lens 14 and spatial filter 15. The image sensor 16 simultaneously acquires a first interference fringe image generated by the reflected light beams from the test surface 8 and reference surface 11 and a second interference fringe image generated by the reflected light beams from the vibration detection surface 9 and reference surface 11 at once. The image sensor 16 and test surface 8 are positioned to be optically conjugate with each other via the image formation lens 14. The spatial filter 15 prevents unnecessary light from mixing in the image sensor 16.

In an ideal state in which no measurement error is caused by a disturbance vibration, a first interference fringe image $I(x,y)$ generated by the test surface 8 and reference surface 11 is represented by:

$$I(x, y) = a(x, y) + b(x, y)\cos\left(4\pi\frac{H(x, y)}{\lambda} + \delta\phi\right) \quad (2)$$

where x and y indicate a pixel address in the image sensor 16, $a(x,y)$ is the bias intensity, $b(x,y)$ is the amplitude intensity, $H(x,y)$ is the shape of the test surface, and $\delta\phi$ is the amount of phase shift of the light beam $I_2$, which is caused by the piezoelectric element 13.

When using a phase calculation algorithm based on the four-step method, the control unit 17 acquires four first interference fringe images $I_1$, $I_2$, $I_3$, and $I_4$ for each phase of the reference light $I_2$ by setting the phase shift amount such that $\delta\phi=0$, $\pi/2$, $\pi$, and $3\pi/2$. The control unit 17 can obtain the shape $H(x,y)$ of the test surface by using:

$$H(x,y)=(\lambda/4\pi)\cdot\tan^{-1}\{(I_4-I_2)/(I_1-I_3)\} \quad (3)$$

In an ideal state in which no measurement error is caused by a disturbance vibration, the control unit 17 can accurately calculate the shape $H(x,y)$ of the test surface by using equation (3). However, if a relative vibration is generated between the test surface 8 and reference surface 11 by a disturbance vibration, an error is added to the phase term of equation (2), and the measurement accuracy of the shape $H(x,y)$ of the test surface 8 decreases. Accordingly, the object of the first embodiment is to correct a measurement error caused by a disturbance vibration in accordance with a measurement sequence shown in FIG. 3, and accurately calculate the shape of the test surface 8 even when there is a disturbance vibration. The measurement sequence according to the first embodiment will be explained below with reference to FIG. 3.

Figure 3:
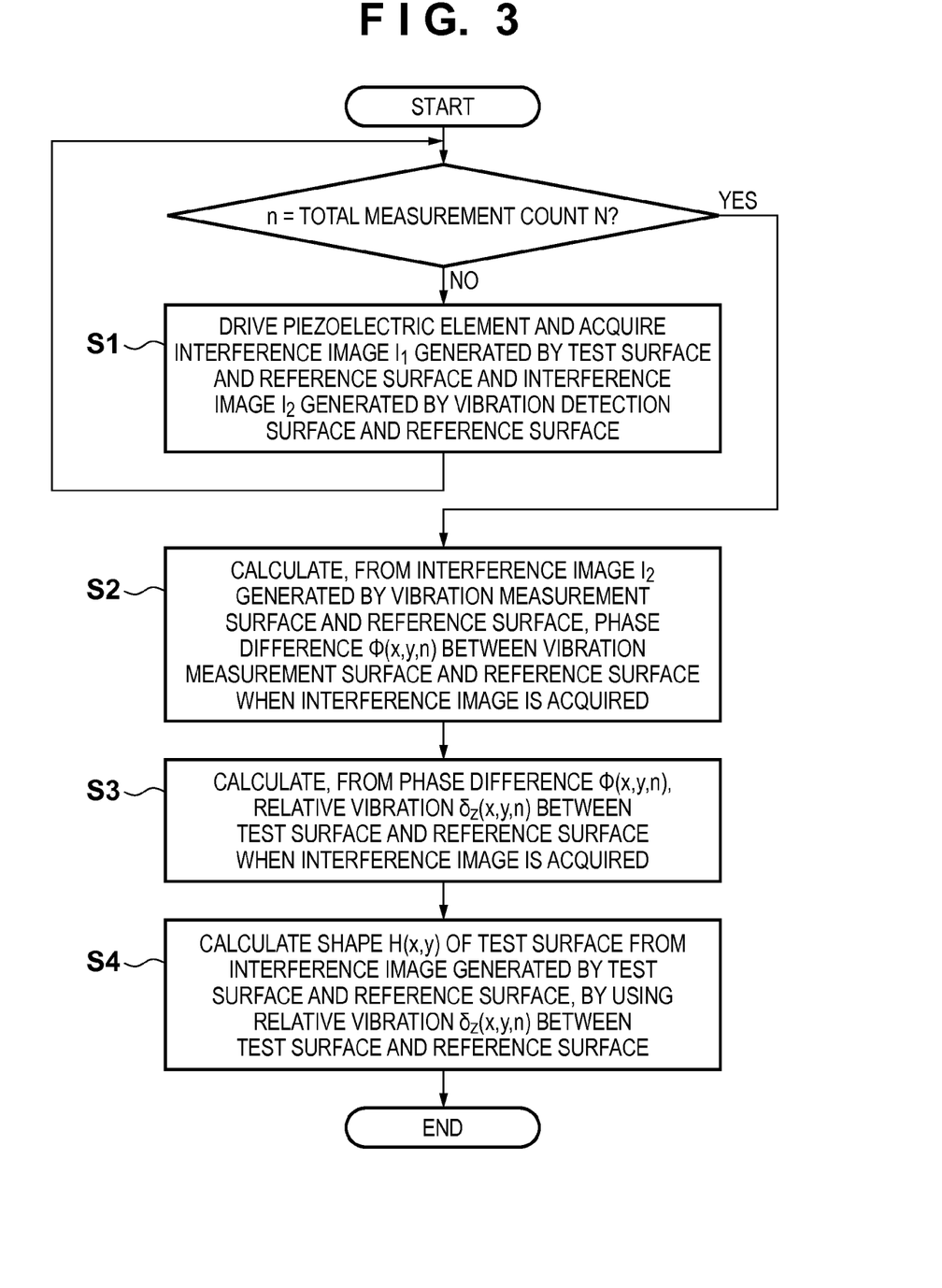
FIG. 3 is a view showing a measurement sequence according to the first embodiment.

In step S1, the control unit 17 drives the piezoelectric element 13 to acquire the first interference fringe image generated by the reflected light beams from the test surface 8 and reference surface 11, and the second interference fringe image generated by the reflected light beams from the vibration detection surface 9 and reference surface 11. In this step, the driving of the piezoelectric element 13 and the acquisition of the interference fringe images are alternately repeated until the number of times of phase shift reaches a predetermined number N. Note that N is at least 3 in order to separate $a(x,y)$ and $b(x,y)$. When there is a disturbance vibration, a first interference fringe image $I_1(x,y,n)$ of the nth (n=1 to N) test surface of the N test surfaces is represented by:

$$I_1(x, y, n) = a(x, y) + b(x, y)\cos\left(4\pi\frac{H(x, y) + \delta z(x, y, n)}{\lambda} + \delta\phi(n)\right) \quad (4)$$

where $\lambda$ is the wavelength, $H(x,y)$ is the shape of the test surface 8, $\delta z(x,y,n)$ is a relative vibration between the test surface 8 and reference surface 11 when the nth interference image is acquired, and $\delta\phi(n)$ is the phase shift amount of the nth interference image.

Also, the relative vibration $\delta z(x,y,n)$ between the test surface 8 and reference surface 11 in equation (4) above can be represented by a uniform component (piston) and inclination component (tilt), and hence is represented by:

$$\delta z(x,y,n)=p(n)+t_x(n)\cdot x+t_y(n)\cdot y \quad (5)$$

where $p(n)$, $t_x(n)$, and $t_y(n)$ respectively indicate the piston component, x-direction tilt component, and y-direction tilt component of the relative vibration when the nth interference fringe image is acquired.

On the other hand, when there is a disturbance vibration, a second interference fringe image $I_2(x,y,n)$ generated by the reflected light beams from the vibration detection surface 9 and reference surface 11 is represented by:

$$I_2(x, y, n) = a(x, y) + b(x, y)\cos\left(2\pi f_x x + 2\pi f_y y + 4\pi \frac{H'(x, y) + \delta z'(x, y, n)}{\lambda} + \delta\phi(n)\right) \quad (6)$$

where $H'(x,y)$ is the shape of the vibration detection surface 9, $f_x$ and $f_y$ are respectively carrier frequencies formed in the x and y directions by the vibration detection surface 9 and reference surface 11, and $\delta z'(x,y,n)$ is a relative vibration between the vibration detection surface 9 and reference surface 11 when the nth second interference fringe image is acquired. The carrier frequencies $f_x$ and $f_y$ are determined by a relative inclination angle between the vibration detection surface 9 and reference surface 11.

In step S2, the control unit 17 calculates a phase difference $\phi(x,y,n)$ between the vibration detection surface 9 and reference surface 11 when each interference image is acquired, from the second interference fringe image $I_2(x,y,n)$ generated by the vibration detection surface 9 and reference surface 11. The carrier frequencies $f_x$ and $f_y$ are superposed on the second interference fringe image $I_2(x,y,n)$. In the first embodiment, the control unit 17 calculates the phase difference $\phi(x,y,n)$ by using the Fourier-transform method of fringe-pattern analysis. The Fourier-transform method of fringe-pattern analysis is a method of obtaining a phase from one second interference fringe image by introducing the carrier frequencies $f_x$ and $f_y$. A brief explanation of the phase calculation by the Fourier-transform method of fringe-pattern analysis will be made below.

First, the second interference fringe image $I_2(x,y,n)$ generated by the vibration detection surface 9 and reference surface 11 and represented by equation (6) above can be deformed as represented by:

$$I_2(x, y, n) = a(x, y) + c(x, y, n)\exp[i(2\pi f_x x + 2\pi f_y y)] + c^*(x, y, n)\exp[i(2\pi f_x x + 2\pi f_y y)] \quad (7)$$

where $c(x,y,n)$ is the complex amplitude of the second interference fringe, and $c^*(x,y,n)$ is the conjugate of $c(x,y,n)$.

$c(x,y,n)$ in equation (8) is represented by $$c(x,y,n) = \{b(x,y)/2\}\exp[i\varphi(x,y,n)] \quad (8)$$

for $$\varphi(x, y, n) = 4\pi\{H'(x, y) + \delta z'(x, y, n)\}/\lambda + \delta\varphi(n) \quad (9)$$

That is, the phase difference $\phi(x,y,n)$ between the vibration detection surface 9 and reference surface 11 is a phase distribution having information about the shape $H'(x,y)$ of the vibration detection surface, the relative vibration $\delta z'(x,y,n)$ between the vibration detection surface 9 and reference surface 11, and the phase shift amount $\delta\phi(n)$ between the light beams $I_1$ and $I_2$.

Equation (10) below is obtained by performing Fourier transform on equation (7), that is, data of the second interference fringe:

$$I(\eta,\zeta) = A(\eta,\zeta) + C(\eta-f_x,\zeta-f_y) + C^*(\eta-f_x,\zeta-f_y) \quad (10)$$

where $A(\eta,\zeta)$ is the Fourier transform of $a(x,y)$, and $C(\eta-f_x,\zeta-f_y)$ and $C^*(\eta-f_x,\zeta-f_y)$ are respectively the Fourier transforms of $c(x,y,n)$ and $c^*(x,y,n)$.

Then, the control unit 17 extracts $C(\eta-f_x,\zeta-f_y)$ by filtering, moves a spectral peak positioned at coordinates $(f_x,f_y)$ to the origin of a frequency coordinate system, and eliminates the carrier frequencies $f_x$ and $f_y$. Subsequently, the control unit 17 obtains $c(x,y,n)$ by performing inverse Fourier transform, and calculates the phase difference $\phi(x,y,n)$ by:

$$\phi(x, y, n) = \tan^{-1}\frac{\text{Im}(c(x, y, n))}{\text{Re}(c(x, y, n))}\left(= 4\pi\frac{H'(x, y) + \delta z'(x, y, n)}{\lambda} + \delta\phi(n)\right) \quad (11)$$

where $\text{Im}(c(x,y,n))$ and $\text{Re}(c(x,y,n))$ are respectively the imaginary part and real part of the complex amplitude $c(x,y,n)$ of the second interference fringe.

The foregoing is the explanation of the Fourier-transform method of fringe-pattern analysis. Since the phase can be calculated from one second interference fringe image by using the Fourier-transform method of fringe-pattern analysis as described above, it is possible to calculate the phase difference $\phi(x,y,n)$ between the vibration detection surface 9 and reference surface 11 when each image is acquired.

In step S3, the control unit 17 calculates a relative vibration $\delta z'(x,y,n)$ between the vibration detection surface 9 and reference surface 11 when each image is acquired, from the phase difference $\phi(x,y,n)$ between the vibration detection surface 9 and reference surface 11 calculated in step S2. A relative displacement when the first image of the second interference fringe is acquired is used as a reference (that is, $\delta z'(x,y,1)=0$). In this case, using equation (9), the relative vibration $\delta z'(x,y,n)$ between the vibration detection surface 9 and reference surface 11 when the nth second interference fringe image is acquired is represented by equation (12) below by:

$$\delta z'(x, y, n) = (\mu/4\Pi)\left[\begin{array}{l}(\varphi(x, y, n) - \delta\varphi(n)) - \\ (\varphi(x, y, 1) - \delta\varphi(1))\end{array}\right] \quad (12)$$

In equation (12) above, the phase differences $\phi(x,y,1)$ and $\phi(x,y,n)$ between the vibration detection surface 9 and the reference surface 11 and the phase shift amounts $\delta\phi(1)$ and $\delta\phi(n)$ are known parameters. Accordingly, the relative vibration $\delta z'(x,y,n)$ between the vibration detection surface 9 and reference surface 11 can be calculated by using these values.

The relative vibration $\delta z'(x,y,n)$ between the vibration detection surface 9 and reference surface 11 is calculated following the procedures described above. However, the target of calculation is the relative vibration between the test surface 8 and reference surface 11. In the first embodiment, the relative positions of the test surface 8 and vibration detection surface 9 are constant, so the piston component and tilt component of the relative vibration with respect to the reference surface 11 are the same. Therefore, the control unit 17 calculates the piston component and tilt component by performing plane approximation on the relative vibration of the vibration detection surface 9, and calculates the relative vibration of the test surface 8 from the calculated piston component and tilt component.

More specifically, the control unit 17 defines a merit function $M_1$ below by using the relative vibration $\delta z'(x,y,n)$ between the vibration detection surface 9 and reference surface 11. Then, the control unit 17 calculates the piston component p(n) and tilt components $t_x(n)$ and $t_y(n)$ of the relative vibration, which minimize the merit function $M_1$, and calculates the relative vibration $\delta z(x,y,n)$ between the test surface 8 and reference surface 11 by using the calculated components in accordance with the equation (5).

$$M_1 = \sum_{x,y} \{\delta z'(x, y, n) - (p(n) + t_x(n) \cdot x + t_y(n) \cdot y)\}^2 \qquad (13)$$

In step S4, the control unit 17 calculates the shape of the test surface 8 from the first interference fringe image generated by the test surface 8 and reference surface 11, by using the relative vibration $\delta z(x,y,n)$ between the test surface 8 and reference surface 11 calculated in step S3. More specifically, the control unit 17 defines a merit function $M_2$ below by using the first interference fringe image $I_1(x,y,n)$ generated by the test surface 8 and reference surface 11, and the relative vibration $\delta z(x,y,n)$ between the test surface 8 and reference surface 11. Then, the control unit 17 obtains $H(x,y)$ that minimizes the merit function $M_2$ as a surface position at the point (x,y) on the test surface 8.

$$M_2 = \sum_{n=1}^{N} \left\{ \begin{pmatrix} I(x, y, n) - \\ A(x, y) + B(x, y)\cos \\ \left(4\pi \dfrac{H(x, y) + \delta z(x, y, n)}{\lambda} + \delta\phi(n)\right) \end{pmatrix} \right\} \qquad (14)$$

where a(x,y), b(x,y), and H(x,y) are unknown constants at the point (x,y) on the test surface 8. Since there are three unknowns including H(x,y) to be obtained, the number N of the first interference fringe images must be three or more.

The measurement sequence according to the first embodiment has been explained above. As described above, the first embodiment is inexpensive because it is unnecessary to add any acceleration sensor for vibration detection unlike in Japanese Patent Laid-Open No. 8-219738. Also, the first embodiment does not use any approximate calculation unlike in Japanese Patent Laid-Open No. 2000-275021. This makes it possible to accurately correct a measurement error caused by a disturbance vibration even in a large-vibration environment.

Second Embodiment

Figure 4:
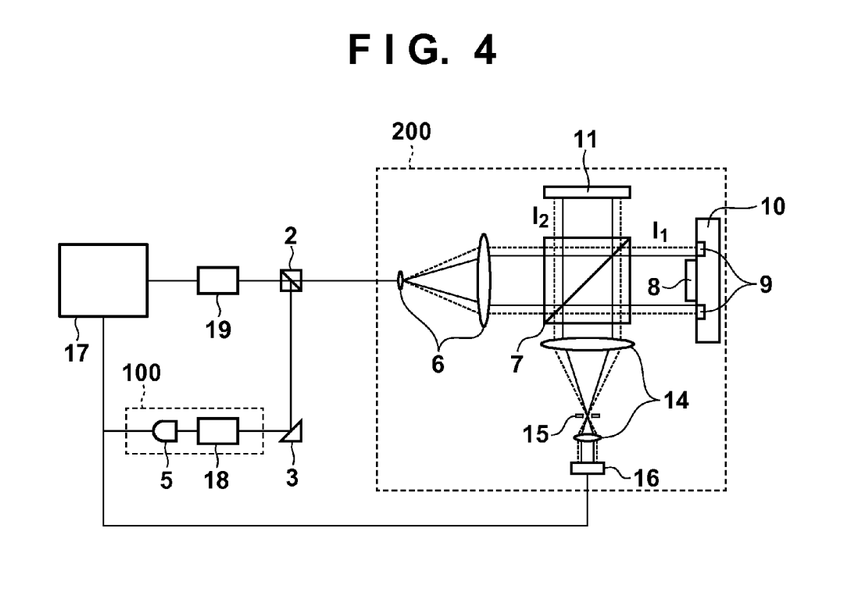
FIG. 4 is a view showing a measurement apparatus according to the second embodiment.

The second embodiment includes a frequency scanning interferometer. FIG. 4 is a schematic view showing an example of a measurement apparatus of the second embodiment. As in the first embodiment, the most basic arrangement including one light source will be explained, but a plurality of light sources may also be used. In addition, the measurement apparatus according to the second embodiment is the same as that of the first embodiment except that the light source 1 is replaced with a frequency scanning light source 19, no piezoelectric element 13 is necessary, and a wavelength measurement unit 100 is changed. Therefore, only the wavelength measurement unit 100 of the measurement apparatus will be explained below.

A light beam guided to the wavelength measurement unit 100 is reflected by a mirror 3, transmitted through a Fabry-perot etalon 18, and incident on a detector 5. Based on the light intensity detected by the detector 5, a control unit 17 controls the wavelength of a light beam emitted from the frequency scanning light source 19. It is necessary to ensure the relative value of each peak of the transmission spectrum of the Fabry-perot etalon 18. In the second embodiment, therefore, a vacuum-medium etalon having a guaranteed transmission spectrum interval is used as the Fabry-perot etalon 18. Since the vacuum-medium etalon has neither the refractive index nor the dispersion of an internal medium, it is readily possible to ensure the relative value of the wavelength. In addition, when using low-thermal-expansion glass or the like as the material of the etalon, it is possible to reduce the expansion ratio with respect to the temperature, and implement a wavelength reference element that is stable for a long time period.

Figure 5:
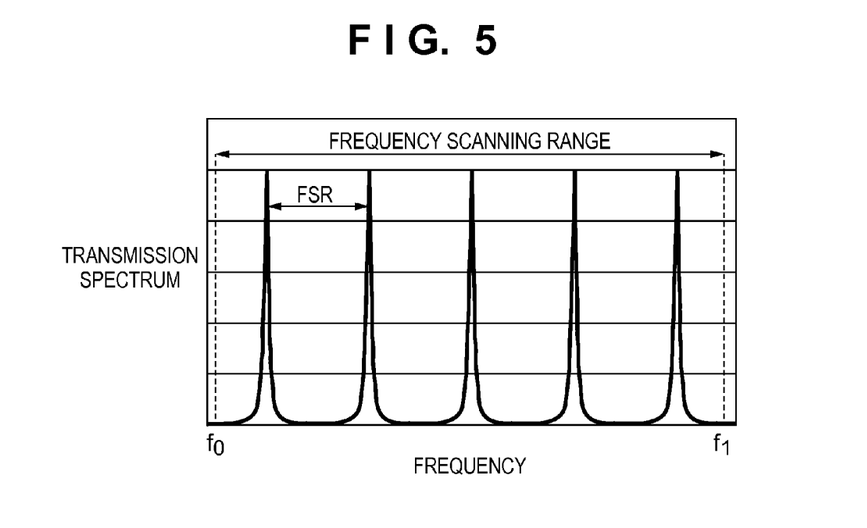
FIG. 5 is a view showing the transmission spectrum of an etalon.

The Fabry-perot etalon 18 is not limited to the vacuum-medium etalon, and may also be an air-gap etalon or solid etalon. In this case, it is necessary to guarantee the internal refractive index and dispersion by, for example, measuring the etalon temperature. Also, to ensure the wavelength at each time during frequency scanning, the Fabry-perot etalon 18 desirably has at least two transmission spectra within the frequency scanning range of the frequency scanning light source 19. FIG. 5 shows an example in which a scanning range from a light source frequency $f_0$ to a light source frequency $f_1$ contains five transmission spectra.

In the frequency scanning interferometer in an ideal state in which no measurement error is caused by a disturbance vibration, an interference fringe image I(x,y,n) generated by a test surface 8 and reference surface 11 is represented by:

$$I(x, y, n) = a(x, y) + b(x, y)\cos\left(4\pi \frac{H(x, y) \cdot \delta f \cdot n}{c} + \phi_0(x, y)\right) \qquad (15)$$

where c is the light speed, $\delta f$ is the frequency scanning amount of the light source 19 between images, $\phi_0(x,y)$ is the initial phase of an interference signal, and n=1 to N (N is at least 3).

When the frequency scanning amount between images is constant, as indicated by equation (15), a sine-wave interference signal having a frequency corresponding to a shape H(x,y) of the test surface 8 is obtained by each pixel of the image sensor 16. A frequency $\nu(x,y)$ of the interference signal depends on only the shape H(x,y) of the test surface 8. Therefore, the control unit 17 can calculate the frequency $\nu(x,y)$ of the interference signal by performing Fourier transform on the interference signal and performing peak detection, and can calculate the shape H(x,y) of the test surface 8 by:

$$H(x,y)=c\cdot\nu(x,y)/(4\pi\cdot\delta f) \qquad (16)$$

Figure 6:
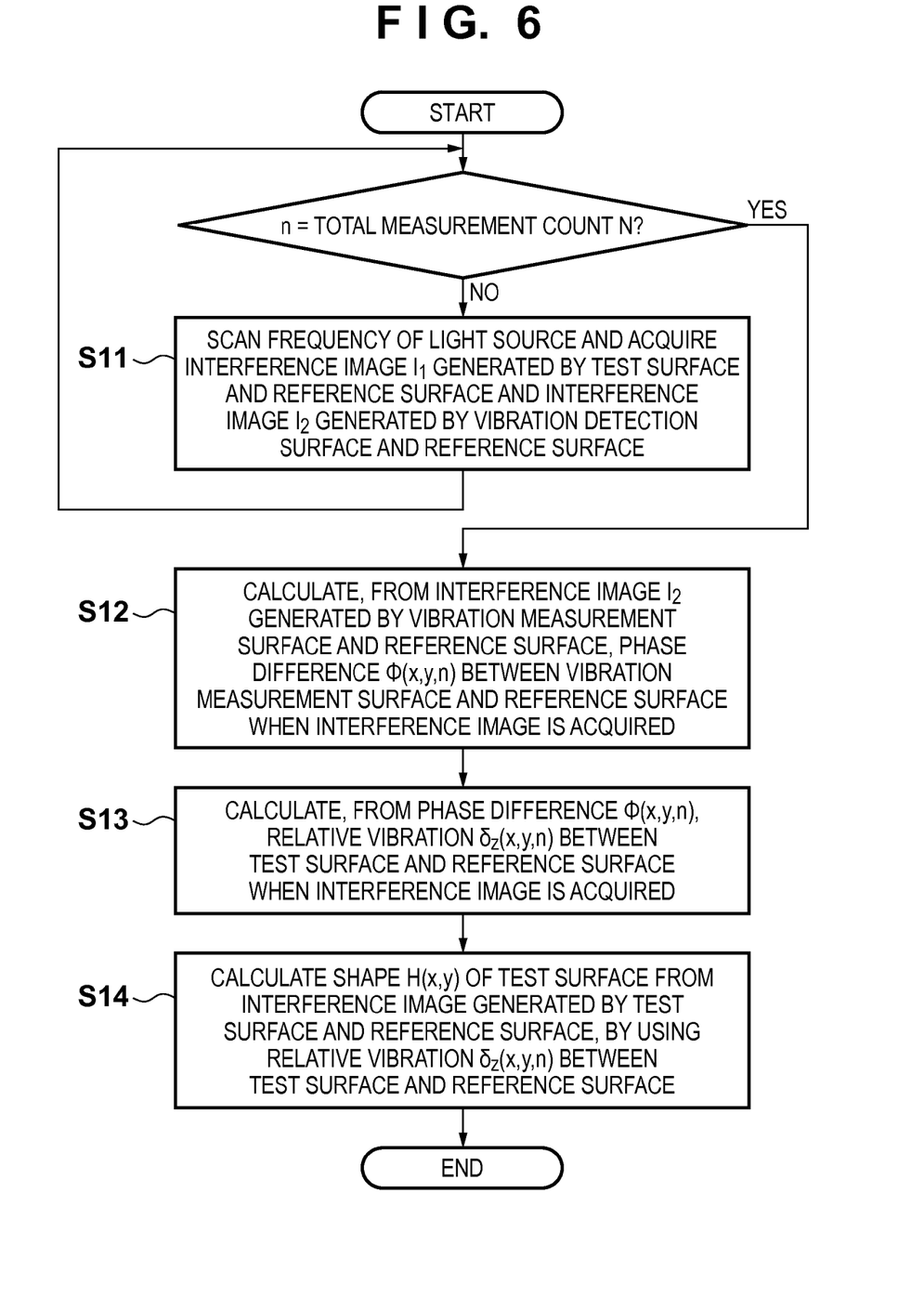
FIG. 6 is a view showing a measurement sequence according to the second embodiment.

The shape H(x,y) of the test surface 8 is calculated following the above procedures. However, if a relative fluctuation occurs between the test surface 8 and reference surface 11 due to a disturbance vibration or the like, a phase error is added to equation (15), and the measurement accuracy decreases in the same manner as that for the phase shift interferometer of the first embodiment. In the second embodiment, therefore, a measurement error generated by a disturbance vibration is corrected and the shape of the test surface 8 is accurately calculated even when there is a disturbance vibration, in accordance with a measurement sequence shown in FIG. 6. The measurement sequence according to the second embodiment will be explained below with reference to FIG. 6. Since this measurement sequence shown in FIG. 6 is basically the same as the measurement sequence of the first embodiment, only portions different from the first embodiment will briefly be explained.

In step S11, the control unit 17 scans the frequency of the frequency scanning light source 19, and acquires a first interference fringe image generated by reflected light beams from the test surface 8 and reference surface 11, and a second interference fringe image generated by reflected light beams from a vibration detection surface 9 and the reference surface 11. In this step, the control unit 17 acquires interference fringe images by scanning the frequency of the light source 19, until a predetermined frequency scanning amount (a total sensing count: N times) is reached. When there is a disturbance vibration, a first interference fringe image $I_1(x,y,n)$ of the test surface 8 when the sensing count is n times (n=1 to N) is represented by:

$$I_1(x, y, n) = \\ a(x, y) + b(x, y)\cos\left(4\pi \frac{(H(x, y) + \delta z(x, y, n)) \cdot \delta f \cdot n}{c} + \phi_0(x, y)\right) \quad (17)$$

On the other hand, when there is a disturbance vibration, a second interference fringe image $I_2(x,y,n)$ generated by the reflected light beams from the vibration detection surface 9 and reference surface 11 is represented by:

$$I_2(x, y, n) = a(x, y) + b(x, y)\cos \quad (18) \\ \left(2\pi f_x x + 2\pi f_y y + 4\pi \frac{(H(x, y) + \delta z'(x, y, n)) \cdot \delta f \cdot n}{c} + \phi_0(x, y)\right)$$

In step S12, the control unit 17 calculates a phase difference $\phi(x,y,n)$ between the vibration detection surface 9 and reference surface 11 when each image is acquired, from the second interference fringe image $I_2(x,y,n)$ generated by the vibration detection surface 9 and reference surface 11. In the second embodiment, the control unit 17 calculates the phase difference $\phi(x,y,n)$ based on the Carre algorithm. Note that the method of calculating the phase difference $\phi(x,y,n)$ is not limited to the Carre algorithm, and the Fourier-transform method of fringe-pattern analysis may also be used as in the first embodiment.

The Carre algorithm is a method of obtaining a phase by using four interference signals having phase differences at a predetermined pitch in one direction. The Carre algorithm will briefly be explained below. Four interference signals $I_1$, $I_2$, $I_3$, and $I_4$ given phase differences $-3\alpha$, $-\alpha$, $\alpha$, and $3\alpha$ at equal pitches are represented by:

$I_1 = a + b \cdot \cos(\phi - 3\alpha)$ $I_2 = a + b \cdot \cos(\phi - \alpha)$ $I_3 = a + b \cdot \cos(\phi + \alpha)$ $I_4 = a + b \cdot \cos(\phi + 3\alpha)$ \quad (19)

By using the four interference signals $I_1$, $I_2$, $I_3$, and $I_4$ by solving equations (19), a phase $\phi$ of the interference signal can be calculated by:

$$\varphi = \tan^{-1}\left\{\frac{\{[3(I_2 - I_3) - (I_1 - I_4)] \cdot [(I_1 - I_4) + (I_2 - I_3)]\}^{\frac{1}{2}}}{(I_2 + I_3) - (I_1 + I_4)}\right\} \quad (20)$$

The foregoing is the brief explanation of the Carre algorithm. As described above, the phase can be calculated from four interference signals having phase differences at equal pitches by using the Carre algorithm.

As indicated by equation (18), the second interference fringe image $I_2(x,y,n)$ generated by the vibration detection surface 9 and reference surface 11 is an interference fringe image spatially given phase differences at equal pitches. By using the Carre algorithm based on interference signals of four pixels adjacent to each other in the x or y direction, therefore, the control unit 17 can calculate the phase difference $\phi(x,y,n)$ between the vibration detection surface 9 and reference surface 11 when each image is acquired from one second interference fringe image. Thus, the phase difference $\phi(x,y,n)$ between the vibration detection surface 9 and reference surface 11 indicated by equation (21) below is calculated:

$$\phi(x, y, n) = 4\pi \frac{(H(x, y) + \delta z'(x, y, n)) \cdot \delta f \cdot n}{c} + \phi_0(x, y) \quad (21)$$

In step S13, the control unit 17 calculates the relative vibration between the test surface 8 and reference surface 11 when each second interference fringe image is acquired, from the phase difference $\phi(x,y,n)$ between the vibration detection surface 9 and reference surface 11 calculated in step S2. A relative displacement when the second interference fringe image is acquired for n=1 is used as a reference (that is, $\delta z'(x,y,1)=0$). In this case, by using equation (21), the relative vibration between the vibration detection surface 9 and reference surface 11 when the nth second interference fringe image is acquired is represented by:

$$\delta z'(x, y, n) = \frac{c}{4\pi \cdot \delta f \cdot n}(\phi(x, y, n) - \phi(x, y, 1)) + \frac{1-n}{n}H'(x, y) \quad (22)$$

In equation (22) above, the phase differences $\phi(x,y,1)$ and $\phi(x,y,n)$ between the vibration detection surface 9 and the reference surface 11, a frequency step amount $\delta f$, and the shape $H'(x,y)$ of the vibration detection surface 9 are known parameters (the shape $H'(x,y)$ of the vibration detection surface 9 is separately calibrated). Accordingly, the control unit 17 can calculate the relative vibration $\delta z'(x,y,n)$ between the vibration detection surface 9 and reference surface 11 by using these values. The method of calculating the relative vibration $\delta z(x,y,n)$ between the test surface 8 and reference surface 11 from the relative vibration $\delta z'(x,y,n)$ between the vibration detection surface 9 and reference surface 11 is the same as that of the first embodiment, so an explanation thereof will be omitted.

In step S14, the control unit 17 calculates the shape of the test surface 8 from the first interference fringe image generated by the test surface 8 and reference surface 11, by using the relative vibration $\delta z(x,y,n)$ between the test surface 8 and reference surface 11 calculated in step S3. More specifically, the control unit 17 defines a merit function $M_3$ below by using the first interference fringe image $I_1(x,y,n)$ generated by the test surface 8 and reference surface 11, and the relative vibration $\delta z(x,y,n)$ between the test surface 8 and reference surface 11:

$$M_3 = \sum_{n=1}^{N}\left\{I(x, y, n) - \left(A(x, y) + B(x, y)\cos\left(4\pi \frac{(H(x, y) + \delta z(x, y, n)) \cdot \delta f \cdot n}{c} + \phi_0(x, y)\right)\right)\right\} \quad (23)$$

Then, the control unit 17 obtains $H(x,y)$ that minimizes the merit function $M_3$, as a surface position at a point $(x,y)$ on the test surface 8.

The measurement sequence according to the second embodiment has been explained above. In this embodiment as described above, it is possible to inexpensively and accurately correct a measurement error caused by a disturbance vibration when compared to the conventional methods, as in the first embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-045786 filed Mar. 1, 2012, which is hereby incorporated by reference herein in its entirety.

What is claimed is:

1. A measurement apparatus for measuring a shape of a test surface by detecting a first interference fringe generated by interfering reference light from a reference surface with measurement light from the test surface, the apparatus comprising:
a vibration detection surface having a set relative position with respect to the test surface, and that receives part of the measurement light;
an image sensor configured to sense, together with the first interference fringe, a second interference fringe generated by interference between light from the vibration detection surface and the reference light at a plurality of times; and
a processor configured to:
obtain data of the first interference fringe and the second interference fringe sensed by the image sensor;
calculate a phase difference corresponding to an optical path length difference between the vibration detection surface and the reference surface from the second interference fringe sensed at each of the plurality of times;
calculate a relative vibration between the reference surface and the test surface from each calculated phase difference; and
calculate the shape of the test surface using the relative vibration and data of the sensed first interference fringe.

2. The apparatus according to claim 1, wherein the vibration detection surface is inclined with respect to a plane perpendicular to an optical axis of the measurement light.

3. The apparatus according to claim 1, wherein the processor is configured to:
calculate a first relative vibration between the reference surface and the vibration detection surface from each of the obtained phase differences;
calculate a second relative vibration between the reference surface and the test surface from the first obtained relative vibration; and
calculate the shape of the test surface using the second relative vibration and data of the sensed first interference fringe.

4. The apparatus according to claim 3, wherein the processor performs Fourier transform on the data of the second interference fringe on which a carrier frequency formed by the vibration detection surface and the reference surface is superposed, extracts only a spectrum containing information of the vibration detection surface by filtering, and obtains the phase difference by performing inverse Fourier transform.

5. The apparatus according to claim 3, wherein letting $I_1$, $I_2$, $I_3$, and $I_4$ respectively be intensities of the second interference fringe at four pixels arranged at a predetermined pitch in one direction in the image sensor, and $\phi$ be the phase difference, the processor obtains the phase difference $\phi$ using the following expression:

$$\varphi = \tan^{-1}\left\{\frac{\{[3(I_2 - I_3) - (I_1 - I_4)] \cdot [(I_1 - I_4) + (I_2 - I_3)]\}^{\frac{1}{2}}}{(I_2 + I_3) - (I_1 + I_4)}\right\}$$

6. The apparatus according to claim 1, wherein letting a(x,y), b(x,y), and H(x,y) be unknown constants at a point (x,y) on the test surface, λ be a wavelength of the reference light and the measurement light, I(x,y,n) be an intensity of the first interference fringe sensed as an nth image of N, which is not less than 3, first interference fringes sensed whenever a phase of the reference light is shifted, and δz(x,y,n) and δφ(n) respectively be a relative vibration between the reference surface and the test surface and a phase shift amount of the reference light when the nth first interference fringe is sensed, the processor obtains H(x,y) that minimizes a merit function M represented by the following expression:

$$M = \sum_{n=1}^{N}\left\{\begin{pmatrix} I(x, y, n) - \\ a(x, y) + b(x, y)\cos \\ \left(4\pi\frac{H(x, y) + \delta z(x, y, n)}{\lambda} + \delta\phi(n)\right) \end{pmatrix}\right\}$$

as a surface position at a point (x,y) on the test surface.

7. The apparatus according to claim 1, wherein letting a(x,y), b(x,y), and H(x,y) be unknown constants at a point (x,y) on the test surface, c be a light speed, I(x,y,n) be an intensity of the first interference fringe sensed as an nth image of N, which is not less than 3, first interference fringes sensed whenever a frequency of the reference light and the measurement light is shifted by δf, and $\phi_0(x,y)$ be a phase difference corresponding to an optical path length difference between the reference surface and the test surface when a first image of the first interference fringe is sensed, the processor obtains H(x,y) that minimizes a merit function M represented by the following expression:

$$M = \sum_{n=1}^{N}\left\{I(x, y, n) - \left(a(x, y) + b(x, y)\cos\left(4\pi\frac{(H(x, y) + \delta z(x, y, n)) \cdot \delta f \cdot n}{c} + \phi_0(x, y)\right)\right)\right\}$$

as a surface position at a point (x,y) on the test surface.

8. A measurement method of measuring a shape of a test surface using an measurement apparatus for detecting a first interference fringe generated by interfering reference light from a reference surface with measurement light from the test surface, the measurement apparatus having an image sensor and a processor, the method being executed by the measurement apparatus and comprising the steps of:
sensing together with the first interference fringe, a second interference fringe generated by interference between the reference light and light from a vibration detection surface having a set relative position with respect to the test surface and receives part of the measurement light at a plurality of times using the image sensor; and
using the processor,
obtaining data of the first interference fringe and the second interference fringe sensed by the image sensor;
calculating a phase difference corresponding to an optical path length difference between the vibration detection surface and the reference surface from the second interference fringe sensed at each of the plurality of times;

calculating a relative vibration between the reference surface and the test surface from each calculated phase difference; and calculating the shape of the test surface using the relative vibration and data of the sensed first interference fringe.

9. The apparatus according to claim 3, wherein the processor calculates, by performing plane approximation on the first relative vibration, a piston component and tilt component of the approximated plane and calculates the second relative vibration from the calculated piston component and tilt component.

* * * * *